United States Patent
Hassan et al.

(10) Patent No.: US 8,589,409 B2
(45) Date of Patent: *Nov. 19, 2013

(54) SELECTING A DATA ELEMENT IN A NETWORK

(75) Inventors: Hany M. Hassan, Cairo (EG); Amgad M. Madkour, Sheikh Zayed (EG)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 13/189,881

(22) Filed: Jul. 25, 2011

(65) Prior Publication Data

US 2012/0054200 A1    Mar. 1, 2012

(30) Foreign Application Priority Data

Aug. 26, 2010   (EP) ..................................... 10174141

(51) Int. Cl.
   *G06F 17/30* (2006.01)

(52) U.S. Cl.
   USPC ................... 707/748; 707/723; 707/E17.011

(58) Field of Classification Search
   USPC ............................ 705/1.1–348; 707/705–780
   See application file for complete search history.

(56) References Cited

U.S. PATENT DOCUMENTS

| | | | |
|---|---|---|---|
| 7,188,106 B2 * | 3/2007 | Dwork et al. .......................... 1/1 |
| 7,502,789 B2 * | 3/2009 | Yao et al. ............................. 1/1 |
| 7,805,440 B2 * | 9/2010 | Farrell et al. .................... 707/728 |
| 8,078,617 B1 * | 12/2011 | Neveitt et al. ................. 707/732 |
| 8,122,023 B2 * | 2/2012 | Lewak et al. ................... 707/736 |
| 2009/0006290 A1 * | 1/2009 | Gunawardana et al. ......... 706/14 |
| 2009/0248661 A1 * | 10/2009 | Bilenko et al. ..................... 707/5 |
| 2010/0115003 A1 * | 5/2010 | Soules et al. .................. 707/822 |
| 2010/0125572 A1 * | 5/2010 | Poblete et al. ................. 707/722 |
| 2010/0169328 A1 * | 7/2010 | Hangartner .................... 707/751 |
| 2011/0280640 A1 * | 11/2011 | Gnanasambandam et al. . 400/76 |

OTHER PUBLICATIONS

Liang, Huizhi, et al. "Connecting users and items with weighted tags for personalized item recommendations", 2010, In Proceedings of 21st ACM Conference on HyperText and Hyper-Media, ACM, Toronto.*

* cited by examiner

*Primary Examiner* — Fred I Ehichioya
*Assistant Examiner* — Michelle Owyang
(74) *Attorney, Agent, or Firm* — Patents on Demand P.A.; Brian K. Buchheit; Scott M. Garrett (57) ABSTRACT

One embodiment of the disclosure can represent within a K-partite graph, weighting factors between a set of identifier elements and a set of data elements. The K-partite graph can also represent weighting factors between the set of identifier elements and a set of metadata elements. In the K-partite graph, the set of identifier elements, the set of data elements, and the set of metadata elements are independent and disjoint sets such that no two vertices within a same set are adjacent. A score vector can be calculated that ranks each data element in a set of data elements. The score vector can be calculated from the weighting factors. At least one data element from the set of data elements can be selected using the score vector and a predetermined selection criterion.

15 Claims, 6 Drawing Sheets

SELECTING A DATA ELEMENT IN A NETWORK

BACKGROUND

The present invention relates to computing networks.

Each social computing platform such as Facebook, Bibsonomy and MySpace contains various services which present wealth of information to users. There exists various service items range from user's recommendation, shopping services and items recommendation or news headlines recommendations. The current state-of-the art systems depend on the mutual recommendation between the large numbers of available items presented to users through social computing platforms.

BRIEF SUMMARY

One embodiment of the disclosure can represent within a K-partite graph, weighting factors between a set of identifier elements and a set of data elements. The K-partite graph can also represent weighting factors between the set of identifier elements and a set of metadata elements. In the K-partite graph, the set of identifier elements, the set of data elements, and the set of metadata elements are independent and disjoint sets such that no two vertices within a same set are adjacent. A score vector can be calculated that ranks each data element in a set of data elements. The score vector can be calculated from the weighting factors. At least one data element from the set of data elements can be selected using the score vector and a predetermined selection criterion.

DETAILED DESCRIPTION

The solutions known for recommending items in social networks deploy the mutual recommendation between users and items to be recommended for a given user. For example, an item would be recommended to a user based on shared mutual items. However, such solutions do not take into account the underlying semantic features.

To elaborate, the variety of items and the rich shared features between those items may dictate the need for a more scalable recommendation mechanism that can make use of the semantic similarity between them. That is, there is a crucial need for techniques that can handle the increasing amount of feature rich items presented through social computing platforms such as Facebook or BibSonomy. The features associated with those items range from user preferences, activities, posts, bookmarks, interests to connections to other users. The techniques currently used present recommendations based on the connections between users and items to be recommended while ignoring the underlying semantic features that might introduce strong similarities between them. There is therefore a need (satisfied by embodiments of the disclosure) for a scalable recommendation technique that takes into account the underlying semantic features of the items to be recommended.

In other words, the disclosure provides an enhanced solution to produce recommendations of items based on both the mutual items interaction and the semantic features for those items. In one embodiment, the disclosure provides a social computing recommendation technique that can accommodate for the rich features associated with the items to be recommended. Embodiments of the invention are based on K-partite graph representation which is used to model various semantic features along with their interactions. The proposed technique harnesses the power of semantic features components using mutual relations. In some embodiments the induction is performed given the representation of the rich semantic features on a K-Partite graph.

In accordance with the embodiments of the invention, feature-rich recommendation is represented as a K-partite graph comprising disjoint sets representing: the resources (also referred to thereinafter as "data element" or "target") which designate the items to be recommended, an identifier representing any item that encloses a set of features, and any arbitrary number of features associated with those identifiers. Each feature (also referred to thereinafter as "metadata") is represented as a disjoint set of vertices in the graph.

A K-partite graph represents a graph whose graph vertices can be partitioned into disjoint sets so that no two vertices within the same set are adjacent. For example, a bipartite graph (or bigraph) is a graph whose vertices can be divided into two disjoint sets U and V such that every edge connects a vertex in U to one in V; that is, U and V are independent sets. Similarly, in a tripartite graph, the vertices are partitioned into three sets (partitions) so that no two vertices contained in any one partition are adjacent.

In accordance with embodiments of the invention, a computer-implemented method is provided to select a data element (resource) for a starting identifier element using a predetermined selection criterion.

The recommendation or selected data element thus provided is appropriate for the starting identifier element. An identifier element as used herein encompasses any element or data structure that is used to identify a profile or a contextual identification of an object. For instance, an identifier element may include but is not limited to a book, a periodical, a login, a personnel file, a medical record, a user profile, a user account, a shopping cart on an e-commerce site, or a profile on a social networking site. A data element as used herein encompasses any type or content which may be recommended to the starting identifier element.

The K-partite graph is used to represent weighting factors between a set of identifier elements and a set of data elements. The relationship between the starting identifier elements and the data elements is modeled using a K-partite graph. The K-partite graph is used to further represent weighting factors between a set of identifier elements and the set of metadata elements. The data element belongs to the set of data elements and the starting identifier element belongs to the set of identifier elements. Based on the weighting elements which comprise the K-partite graph the data element for the starting identifier element is selected using the weighting factors between the identifier elements and the data elements and also between the set of identifier elements and the set of metadata elements.

Stated differently, an embodiment of the disclosure provides a social computing recommendation technique that can accommodate for the rich features associated with the items to be recommended. The proposed invention is based on K-partite graph representation which is used to model various semantic features along with their interactions. The proposed technique harnesses the power of semantic features components using mutual relations. The in some embodiments the induction is performed given the representation of the rich semantic features on a K-Partite graph.

The disclosure provides for a computer-implemented method of selecting a data element for a starting identifier element using a predetermined selection criterion. Essentially the computer-implemented method is able to provide a recommendation or selected data element that is appropriate for the starting identifier element. An identifier element as used herein encompasses any element or data structure that is used to identify a profile or a contextual identification of an object. For instance an identifier element may be but is not limited to: a book, a periodical, a login, a personnel file, a medical record, a user profile, a user account, a shopping cart on an e-commerce site, or a profile on a social networking site. A data element as used herein encompasses any type or content which may be recommended to the starting identifier element.

A K-partite graph can represent weighting factors between a set of identifier elements and a set of data elements. The relationship between the starting identifier elements and the data elements is modeled using a K-partite graph. The K-partite graph is used to further represent weighting factors between a set of identifier elements and the set of metadata elements. The data element belongs to the set of data elements and the starting identifier element belongs to the set of identifier elements. Based on the weighting elements which comprise the K-partite graph the data element for the starting identifier element is selected using the weighting factors between the identifier elements and the data elements and also between the set of identifier elements and the set of metadata elements.

An embodiment of the disclosure can calculate a score vector iteratively that ranks each data element of the set of data elements by iteratively traversing the K-partite graph from the starting identifier element to each data element of the set of data elements via the set of metadata elements. The score vector is calculated by adding a multiple of the weighting factors traversed to the value of the score vector. The method further comprises the step of selecting the data elements using the score vector and the predetermined selection criterion. Depending upon the embodiment the predetermined selection criterion can take several different forms. For instance the predetermined selection criterion may be used to select the data element which has either the highest or lowest score from the score vector. More complicated selection means may be even some other embodiments where a certain number of data elements are selected from the set of data elements using the score vector. For instance the data elements which receive above a particular score may be selected or in other embodiments a predetermined number of data elements are selected from the set of data elements in accordance with the value of the score vector. The metadata elements of the set of metadata elements are items of metadata.

The weighting factors between the set of identifier elements and the set of metadata elements reflects how accurately each of the metadata elements relates to a particular identifier element. For instance if a portion of an element of metadata does not describe an identifier element then the weighting factor may be given a zero value, null value, or other value which indicates no relationship. However, if a metadata element does describe an identifier element perfectly then this would be reflected in the weighting factors.

An advantage of an embodiment of the disclosure is that a finite or predetermined number of weighting factors is used to describe the K-partite graph. Based on the relationship or weighting values between the starting identifier element and the individual metadata elements a recommendation or a selection of a data element is achieved with respect to the other identifier elements in the set of identifier elements. This leads to an improved method of selecting or recommending a data element.

In another embodiment the K-partite graph comprises a layer for the set of identifier elements. The K-partite graph further comprises a layer for the set of data elements. The K-partite graph further comprises two or more layers for the set of metadata elements. The weighting factors between the set of identifier elements and the set of data elements and also the weighting factors between the set of identifier elements and the set of metadata elements define the connections of the K-partite graph.

Each of the two or more layers of the metadata elements has a layer weighting factor. The layer weighting factor adjusts the value of the multiple of the weighting factors traversed. Essentially the elements of the set of data elements are broken up into sub-groups which are defined by the different layers. Each of the sub-groups can be and have their relative importance adjusted with respect to each other. This is accomplished by adjusting or defining the weighting factors.

This embodiment is advantageous because the relative importance of metadata can be adjusted according to different classifications of metadata. For instance if the identifier elements were books and the metadata elements were metadata describing the books different types or sub-classifications of books could be grouped according to layers for the description of the metadata elements. Using this example a data element may be a recommendation for another book for a user. The layers may be divided according to a classification such as fiction or non-fiction. The layers of data elements may also be divided into subjects.

In a problem such as book recommendation, different metadata layers could be created. For example, for each user (identifier), we could recommend books (target) based on the information we know about the books available (metadata). In a K-partite graph, the user ID could act as an element (node) in the identifier layer. The book to be recommended is going to be an element (node) in the target layer. An author could be an element (node) in a metadata layer called authors. Year of publishing could be an element (node) in a publishing year metadata layer. The number of metadata layers could increase according to the implementer needs.

Variable weights could be assigned based on the implementer's requirements to connections between different layers. Metadata layers or target layers could be assigned higher weights than others. For example in a friend recommendation system, the "number of friends" for users could act as a more important metadata layer than the "number of groups" that those friends join. In a book recommendation system, the number of purchases could act as a more important metadata layer than the author name of the book. Accordingly, higher weights could be assigned to those dominating layers.

In another embodiment, there is an identifier-metadata matrix which contains a weighting factor between each element of the set of identifiers and each element of the set of metadata elements. There is an identifier data matrix which contains a weighting factor between each element of set the identifier elements and each element of the set of data elements. These two matrices are used to represent the weighting factors of the K-partite graph.

In another embodiment, the set of metadata elements is divided into two or more layers. Each layer has a weighting factor. The path is additionally represented by a fourth value. The fourth value is determined by the layer of the first metadata element. The score in the score vector is replaced by the value of the score plus the multiple of the first value, the second value, the third value, and the fourth value. In this embodiment an implementation of how to incorporate the weighting factor into the algorithm is described.

In another embodiment, the predetermined iteration criterion is at least partially the completion of a predetermined number of iterations. The normalized score vector is calculated using a predetermined number of iterations.

In another embodiment, the predetermined iteration criterion is the convergence of the normalized score vector to the value of the normalized score vector for the previous iteration. A variety of different schemes could be used to test for convergence. For instance the two vectors could be subtracted from each other and then the root mean square of the resulting vector could be used as a measure. Additionally the values of individual elements of the vector could also be checked. For instance a portion or certain values in the vector may converge but other elements of the vector have not.

In another embodiment, each score of the score vector is initialized with the same value. For instance the score of zero could be used to initialize the score vector. In another example the initialization value could be 1 divided by the number of scores that are contained in the score vector. For instance the score vector could be normalized such that it has a value of 1 in order to represent a probability.

In another embodiment, the weighting factors are at least partially determined by input received by an operator. Essentially the weighting factors are typed in or entered by an operator. This could be through numerical input or it could also be through an opinion. For instance if the identifier elements are books then the weighting factors could in some instances be a person's opinion of a book or of the relevance of a piece of metadata of how well it describes a book.

In another embodiment, weighting factors are at least partially determined by natural language processing. For instance for determining the weighting factors between the identifier and the metadata natural language processing could be used to examine the metadata and assign a score as to how well the metadata related to the identifier. This could be implemented by using a natural language processing module.

In another embodiment, the weighting factors are at least partially determined by the number of metadata elements or data elements. The weighting factors could be simply the value of 1 divided by the number of connections to or from the particular metadata element or data element. This could be useful in the situation where weighting factors are not given by a user or it is not possible to rank using natural language processing.

In another embodiment, the data element comprises a text tag. A text tag used herein encompasses a simple descriptor or description which comprises several words or a single word. Each identifier element of the set of identifier elements comprises at least partially some text. The weighting factor between a particular data element and a particular identifier element is determined at least partially by the frequency of the text tag within the text of the identifier element. This embodiment is advantageous because it provides a quantitative measure of the relevance of a text tag to a particular identifier element. The use of counting the number of times a text tag appears may be computationally less intensive than using a natural language processing module.

In another embodiment, multiple data elements are selected from the set of data elements using the score vector and the predetermined selection criterion. For instance the predetermined selection criterion could be to select all data elements above or below a particular score. Alternatively the predetermined criterion could be to select a predetermined number of data elements with the largest or smallest scores.

In another embodiment, the data element is any one of the following: a multimedia clip, a keyword, a bookmark tag or identifier, a text, a book recommendation, and a product recommendation.

In another embodiment, the starting identifier element is any one of the following: a user account, a user profile, a customer account, a social networking profile, a medical health record, a book, and a journal article.

In another aspect, the invention provides for a computer system for selecting a data element for a starting identifier element using a predetermined selection criterion. The computer system comprises a processor. It is understood herein that a processor may refer to multiple processors and it also may refer to processors spread across multiple computers.

It is understood herein that references a criterion also encompass more than one criterion, that is to say that references to criterion are also to encompass criteria.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
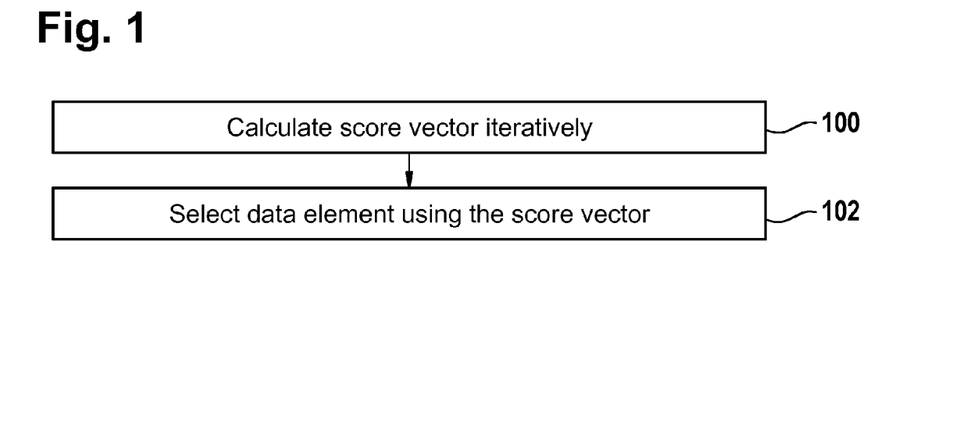
FIG. 1 shows a flowchart which illustrates an embodiment of a method according to the invention.

Referring to the figures, FIG. 1 shows a high-level flowchart for selecting a resource (data element) from a K-partite graph, according to certain embodiments of the invention. The embodiment shown in FIG. 1 may be implemented as a computer-implemented method, a computer program product, executed by a computer system or stored as instructions on a computer-readable storage medium.

In step 100, a score vector is calculated iteratively. The score vector is iteratively calculated and it ranks each data element of the set of data elements traversing the K-partite graph from the starting identifier to each of the data elements of the set of data elements via the set of metadata elements.

More specifically, in one embodiment, the score vector is calculated by adding a multiple of the weighting factors traversed to the value of the score vector.

In step 102, a data element is selected using the score vector calculated in step 100. The data element is selected for a starting identifier element using a predetermined selection criterion.

Figure 2:
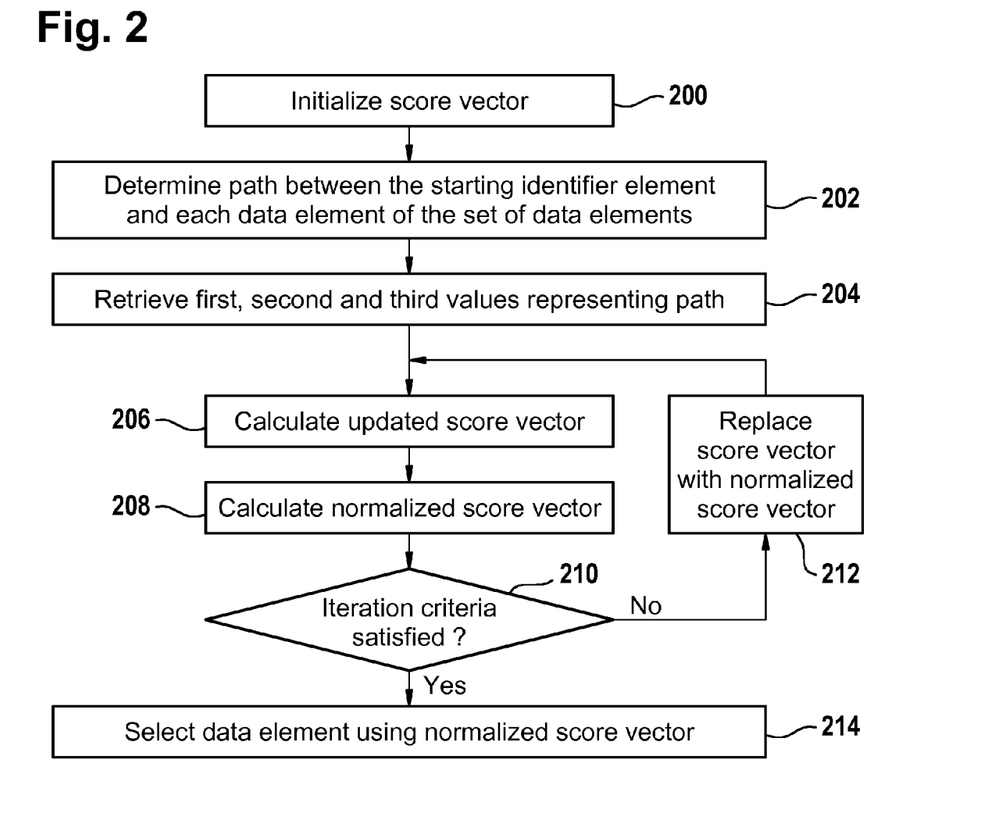
FIG. 2 shows a flowchart which illustrates a further embodiment of a method according to the invention.

FIG. 2 shows a flowchart for selecting a data element in a K-partite graph, according to embodiments of the invention.

In step 200 the score vector is first initialized.

In step 202 a path is determined between the starting identifier element and each data element of the set of data elements.

In step 204 first, second and third values representing the path are retrieved. Such values can be retrieved from a suitable computer storage medium such as a hard drive or disc, a database, or from computer memory.

In step 206 an updated score vector is calculated.

In step 208 the score vector is normalized or scaled.

In step 210 an iteration criterion is checked. The iteration criterion may comprise a requirement for a minimum and/or maximum of iterations, or a criterion which at least partially includes a condition related to the normalized score vector, such as determining if the normalized score vector has converged to the initialized score vector or to a previous iteration of calculating the score vector. If the iteration criterion is not satisfied, then the method proceeds to step 212.

In step 212, the score vector is replaced with the normalized score vector. Then step 206 to 210 are repeated to calculate an updated score vector, calculate the normalized score vector is calculated, and then check the iteration criterion. If the iteration criterion is satisfied, then the method proceeds to step 214. In step 214 the data element is selected using the normalized score vector and a predetermined selection criterion.

Figure 3:
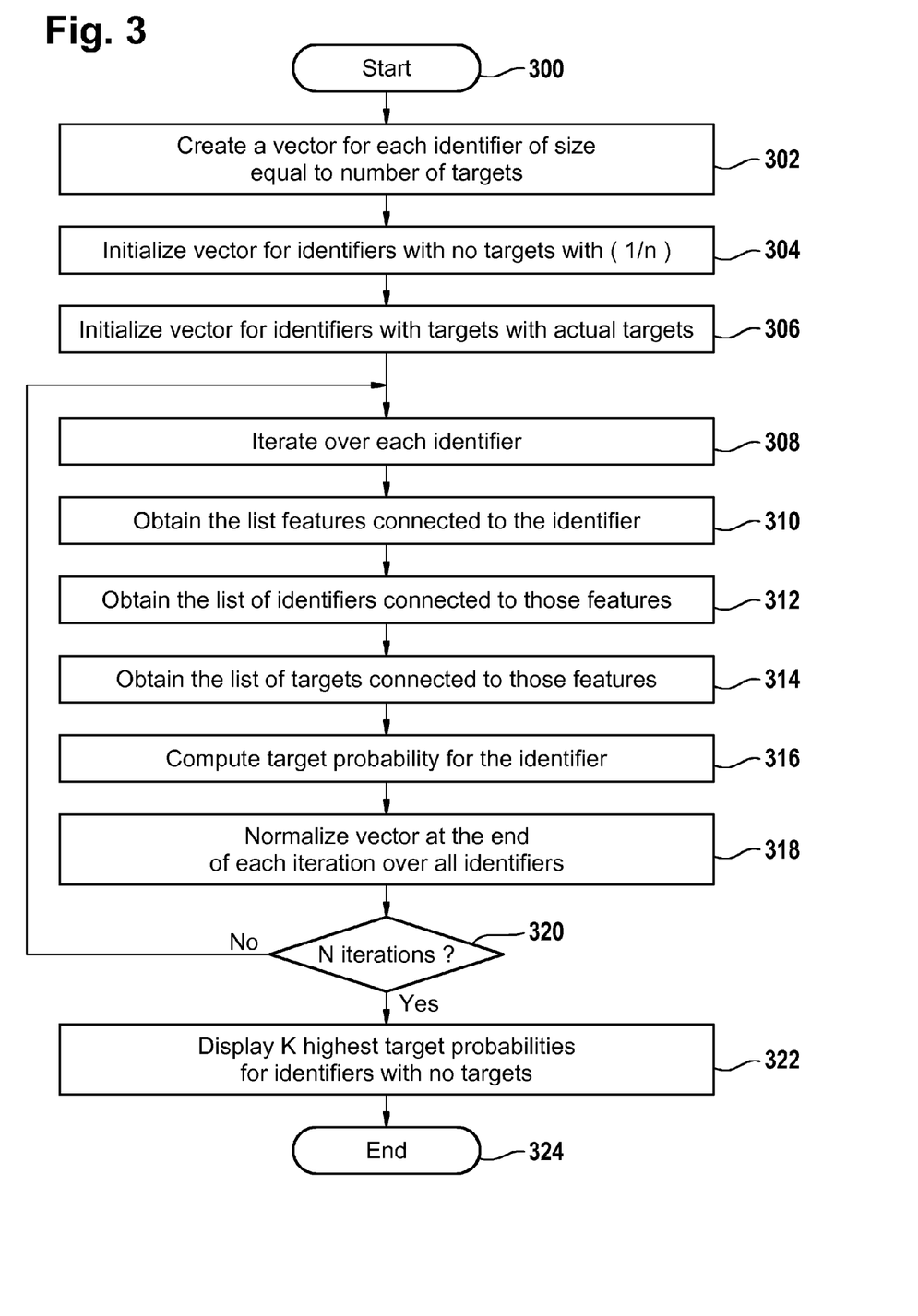
FIG. 3 shows a flowchart which illustrates a further embodiment of a method according to the invention.

FIG. 3 shows a flowchart for selecting a data element in a K-partite graph according to embodiments of the invention. In step 300, the method starts. In step 302 a vector is created for each identifier of size equal to the number of targets. This is equivalent to initializing the score vector. Next in step 304 the vector is initialized with identifiers where each value of the vector is initialized with the value of 1 over n where n is the number of targets or data elements. In step 306 vectors for identifiers with targets with actual targets are initialized. In step 308 the method iterates over each identifier. In step 312, the list of identifiers connected to those features is obtained. In step 314, the list of targets connected to those identifiers is obtained. In step 316, the target probability for the identifier is computed. In step 318, the vector at the end of each iteration over all identifiers is normalized. In step 320 the number of iterations is checked. If a predetermined number of iterations has not been performed then the method performs back to step 308. If the predetermined number of iterations has been completed then the method proceeds to step 322. In step 322 a predetermined number of targets or data elements with the highest probabilities or score vector elements are displayed. Then finally in step 324 the method has ended.

FIG. 3 illustrates the K-Partite graph traversal phases. In a first phase, the list of features relating to the identifier being inspected is obtained. In a second phase, the list of identifiers linked to the features obtained from the first phase is determined. In a third phase, the list of resources linked to the identifiers obtained from the second phase is determined. A fourth phase re-computes the probability vectors for the identifiers obtained in the second phase with the resources linked to those identifiers. For example, computation for the first element in the identifier vector for the first resource equals the summation of the initial weight of the vector element and the weight between the identifier being inspected and the feature obtained in phase 1 multiplied by the weight between the identifier and the resource.

In the event of including an identifier that contains no resources in the calculations, the resources probability vector for that post will be created based on all available resources to be recommended by the system. For example, the resources vector for a post included in a system containing 5 resources would generate a probability of ⅕ for each resource initially. The value changes per iteration later. Iteration is the total computations done across all the nodes of interest. The number of iterations needed "N" is adjusted according to the implementers need. After "N" iterations, the highest probability items in the identifier's resources vector are chosen.

Figure 4:
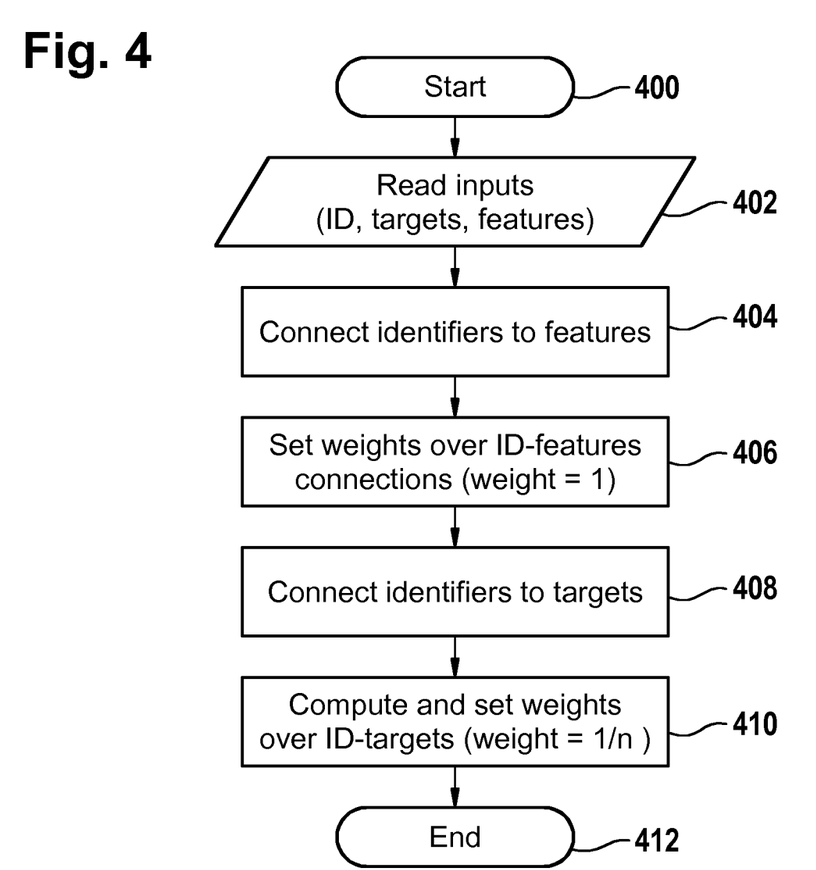
FIG. 4 shows a flowchart which illustrates method of setting the weighting factors for the K-partite graph, which is a portion of an embodiment of the method according to the invention.

FIG. 4 shows a flowchart for setting the weighting factors for the K-partite graph according to certain embodiments of the invention. In step 400 the method starts. In step 402 inputs for the K-partite graph are read. This includes identifiers (also referred to as identifier elements), targets (also referred to as resources or data elements) and features (also referred to as metadata).

In step 404 the identifiers are connected to features. In step 406 the weighting factors between the identifiers and the features is set. In the example illustrated in FIG. 4, the weighting is set to be equal to 1. However, the skilled person will readily understand that the weighting factors are not limited to such value and that the weighting factors could be set to other values (e.g. provided as an input or received from a user or a database). Alternatively natural language processing could also be used to set the weighting factors.

In step 408 the identifiers are connected to the targets. This defines links within the non-partite graph between the identifier elements and the data elements. In step 410 the weighting factors between the identifiers and the targets is set. In one example the weighting factor could be equal to 1 over n where n is the number of connections that were made in step 408. Alternatively the weighting factor could be input by a user or determined using an algorithm such as natural language processing to develop a correlation between the identifier and the data element. Finally in step 412 the processing ends.

FIG. 4 thereby illustrates the graph construction phase of the K-Partite graph. The first phase is to read the nodes that will be used to build the graph. Next, links are established between the nodes and one another. This includes creating links between the identifiers and features. Each created link contains an assigned weight. This can be set according to the predefined requirements such as implementers need. A default value of 1 was set for illustration purposes over all links between the identifiers and features. Then, links between the identifiers and resources to be recommended are created. The weights for the links between each identifier and the resources equals to 1 divided by the total number of resources linked to the identifier. In the social network field, a resource could be linked to many tags. For example, a resource having 3 tags leads to a weight equal to ⅓ (i.e.: 1/n) for each link between the identifier and its resources.

Figure 5:
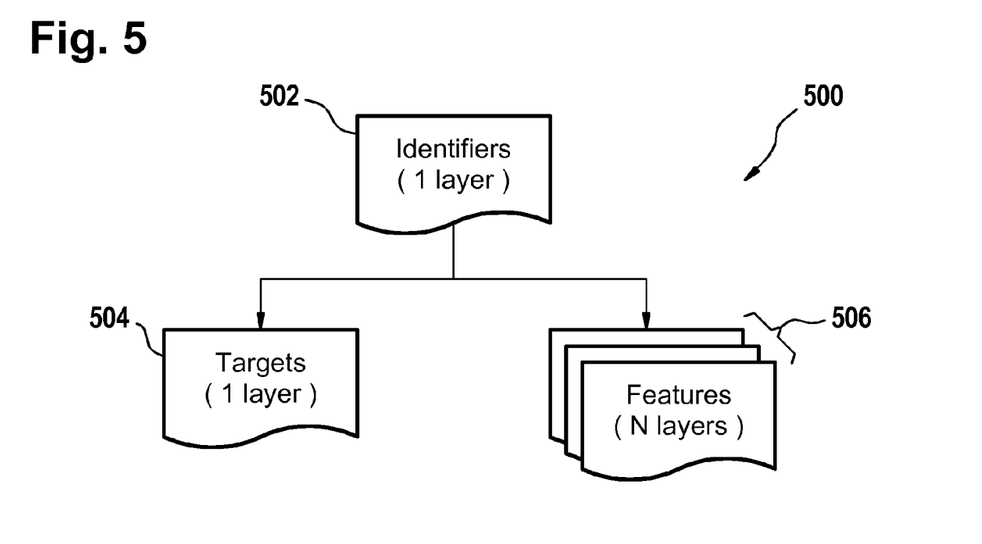
FIG. 5 shows a diagram which illustrates the different graph layers of a K-partite graph used in an embodiment of the invention.

FIG. 5 shows a diagram which illustrates the different graph layers of a K-partite graph used in embodiments of the invention. The K-partite graph 500 is shown as having one layer for the identifier elements 502, another layer for the data elements 504, and a group of three layers used for the metadata elements 506. For embodiments of the invention, the metadata elements will be distributed into one of the layers 506.

Figure 6:
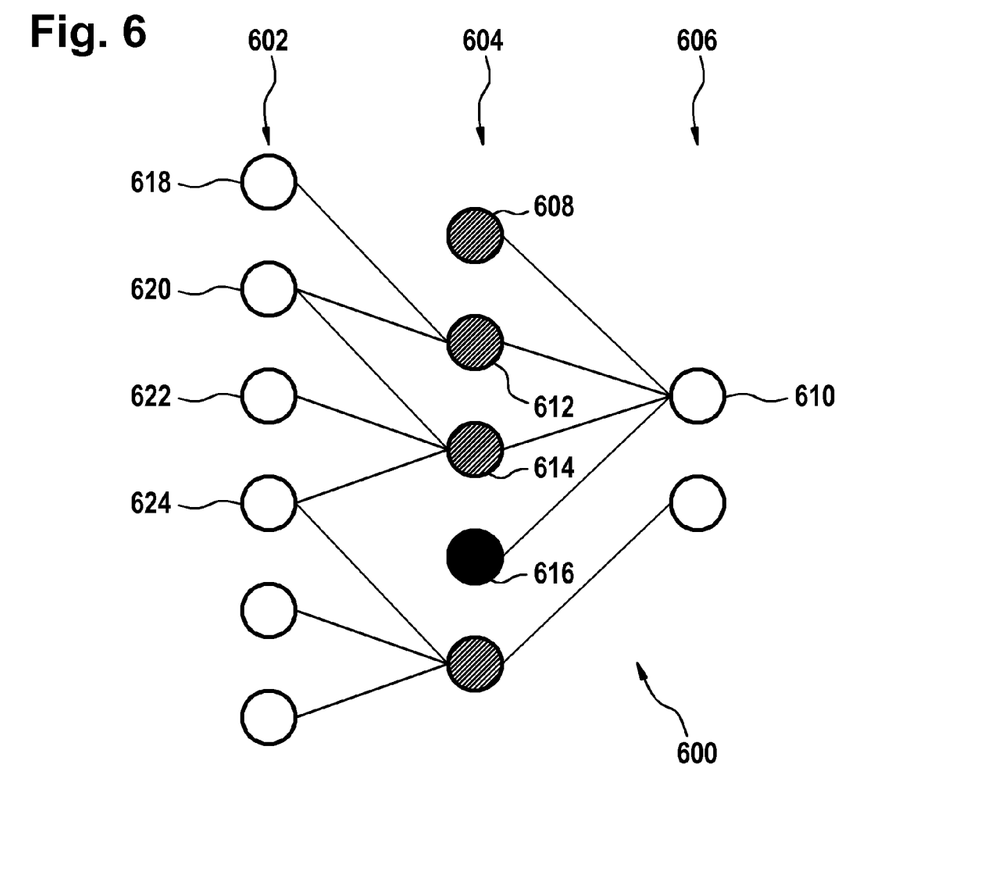
FIG. 6 shows a diagram which illustrates a K-partite graph.

FIG. 6 shows an example of a K-partite graph 600. The K-partite graph 600 shown in FIG. 6 is comprised of data elements 602, identifier elements 604, and metadata elements 606. The data elements 602 are connected to the identifier elements 604 and identifier elements 604 are connected to metadata elements 606. FIG. 6 also shows a starting identifier element 608. The starting identifier element 608 is connected to a single metadata element 610 in this example. The metadata element 610 is connected to three other identifier elements 612, 614, 616. The identifier element 616 has no connection to any of the data elements 602. Therefore the identifier element 616 will not be involved in the selection of a data element. However, identifier elements 612 and 614 are connected to a number of data elements 618, 620, 622, 624. The data element 620 has connections to identifiers 612 and 614. The execution of the method according to the invention will therefore involve two paths leading to data element 620.

The K-partite represented in FIG. 6 is a tri-partite graph. The black nodes shown in FIG. 6 represent the identifiers that do not have any link to resources. This indicates that items are to be recommended to those particular identifiers. The second set defines the features that are common to all the identifiers. The third set represents the resources linked to those items or identifiers. The same could be applied to a K-Partite graph with another K value to accommodate for more features by adding more disjoint sets to the graph as in FIG. 5.

The invention also provides a novel recommendation induction technique for the K-Partite graph representation as described below.

For some resource u in the disjoint set U, there is a set of tags associated with that resource. Similarly, for each resource there is a set of associated features that belongs to various disjoint features sets V1 . . . Vn. The feature sets may also be referred to as resource sets. Weights are assigned for possible tags t in T for each resource (post set V) as described thereinafter:

For each resource v, all features for the feature set U (u1 . . . un) are processed as follows: For each feature ui being processed, all associated resources r1 through rn are obtained, and for each tag Tk, Tkv representing the probability of Tk to be associated with resource v is computed according to the following equation:

$$T_{kv} = \sum_i \sum_j W(v, u) \cdot W(r_i, u_j) \cdot T_k(r_i, u_j),$$

Where w(v,u) is the feature weight for post v and feature u.

When all resource v have been processed, Ti vectors are normalized, by dividing each value of T vector by summation over all values in that vector.

The process ends when converged, i.e. there are no significant changes on the weights over iterations.

Figure 7:
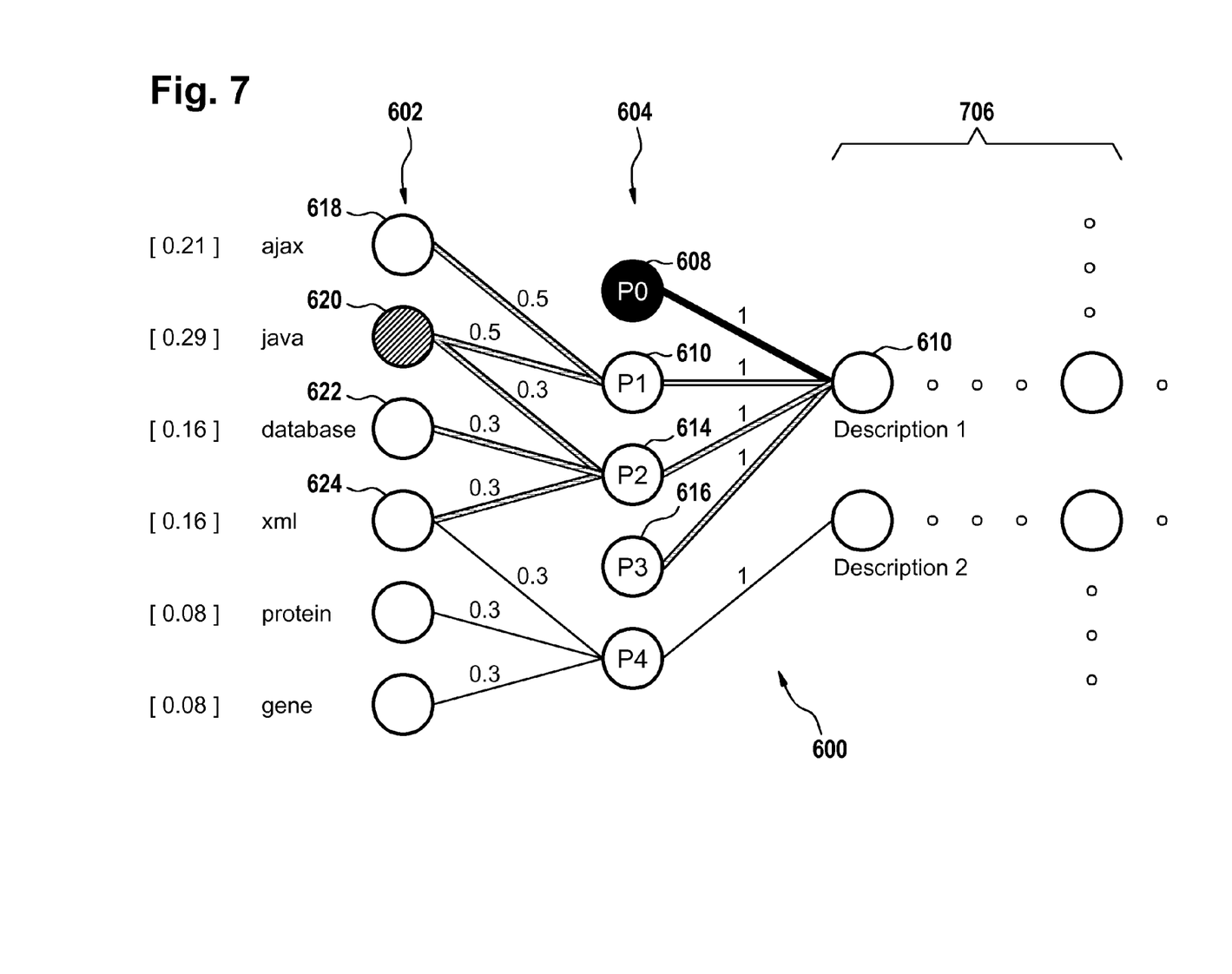
FIG. 7 shows a diagram which illustrates a K-partite graph used to demonstrate an embodiment of the method according to the invention.

In FIG. 7 shows a diagram illustrating the selection of a data element for starting identifier element 608 using a predetermined selection criterion. The structure of the K-partite graph shown in FIG. 7 is similar to the one represented in FIG. 6, but additionally comprises multiple layers 706 of metadata elements. Starting identifier element 608 has a single connection to metadata element 610. Metadata element 610 is connected to identifier elements 608, 612, 614, and 616. In this example, the weighting between each of these identifier elements 608, 612, 614, 616 and the metadata element 610 is assigned a value of 1. The skilled person will readily understand that different weightings could be assigned alternatively to the relationship between the metadata element 610 and each of the identifier elements 608, 612, 614, 616. The identifier element 616 is not connected to any of the data elements 602. Identifier element 612 is connected to data elements 618 and 620. In this example, the weighting is assigned by dividing 1 by the number of connecting data elements. Therefore the weighting between identifier element 612 and data elements 618 and 620 is equal to 0.5. Identifier element 614 is connected to data elements 620, 622, and 624. Identifier element 614 therefore has connections to three different data elements 620, 622, 624. The weighting between each of these data elements 620, 622, 624 and identifier element 614 is assigned a value of 0.3 to approximate a weighting of one third. Value 0.3 is used in the calculation of this example.

Even if not limited to such applications, the invention has particular advantages to provide tag recommendation for BibSonomy. BibSonomy is a social network used for sharing bookmarks and lists of literature among users. Users are able to save their discovered bookmarks or publications on BibSonomy server. With BibSonomy, users can access their data from any place. Furthermore, users can discover more bookmarks and publications from friends and other people. Users can add tags to their post to retrieve it more easily. It is very similar to the bookmarks/favorites that are stored within web browsers. Tags represent a simple way to annotate resources with meaningful metadata.

The invention accordingly makes it possible to provide recommendation of tags during bookmarking of resources, whether they are internet bookmarks or bibliographic entries that represent the literature. Bookmark includes useful data such as the description and an extended version of the description. Bibliographic entries which are also referred to as "Bibtex" entries include rich information such as journal name, publisher, description, bibtex abstract, entry type (proceeding, PhD thesis etc.), title, author and year of publication. This rich set of information can be used as features for the method according to the embodiments of the invention in order to determine which tags (as data element) should be recommended to which identifiers (posts which include bookmark and bibtex posts).

The K-Partite based method in accordance with the embodiments of the invention involves three requirements to operate. First, it needs an identifier which represents the item to be analyzed. Second, a set of features that co-relate to those identifiers. Third, a resource which represents the actual data that needs to be induced and/or recommended for identifiers that do not contain a resource. The invention makes it possible to provide identifiers that do not contain any resources with appropriate recommended resources through the induced probabilistic values computed in accordance with the invention.

In the application of certain embodiments of the invention to Bibsonomy, a presented Bibsonomy post presented represents the identifier, the features extracted from BibSonomy represent features, and the saved tags per post correspond to the resources. The graph can be then generated based on the relationships between those three parts.

The weighting schema differs according to the node-node link structure. For example, a common weight is assigned between each identifier and feature. The assigned weight corresponds to 1 in this embodiment case which means that all features are processed equally. For the links between the identifiers and the resources, the value 1 is divided according to the number of links between each identifier (post) and its corresponding recommended resources (tags). For example, if an identifier (post) contains links to two resources (tags), then the weight for the links between the identifier and each resource is 0.5. This is computed by the general formula 1/n where "n" is the number of resources links with each identifier. This divides the probability of resources among all the links for each identifier.

Then a series of iterations is performed in order to induce/determine the missing resources values for identifiers that do not contain links to resources. The final output for identifiers with no resources is a probabilistic value for each possible resource that could be recommended for the current identifier. The higher the probabilistic value, the more relevant the resource is believed to be for the identifier.

FIG. 7 illustrates an exemplary application of the invention to BibSonomy. The identifier is represented by the posts (P0-P5) as it encloses the features of the items being bookmarked. For example, each post can have a feature such as a description (containing instances such as Description 1, Description 2 . . . Description n). Although the skilled person understands that the invention is not limited to specific features, the following description of FIG. 7 will be made with reference to a unique feature, namely "description", for illustrative purpose only. A weight of 1 is assigned to links between the posts and the presented feature instances. This value is constant across all instances of the same feature. Different features could have different weights assigned to them. For example, if another feature like "Author Name" was provided for the post, then it could be assigned a higher weight that the one assigned to the description. The third layer required in the graph comprises the resources to be recommended, which in BibSonomy application is represented by the tags. Links are created between posts and tags that have actual assignments. The remaining posts without links to tags are the ones for which probability values will be determined (P0, P3).

In the recommendation phase, the graph traversal is performed starting with the first post that has unknown resources (P0). The list of features and feature instances connected to this post is then retrieved ("Description 1" as a feature instance in this case). The list of posts linked to this feature instance (P1, P2, and P3) is then obtained where the post being evaluated is discarded from the calculations.

The probability values Tkv for all resources are then induced by applying the induction equation described above. It is noted that P1 and P2 contain links to resources while P3 does not contain any. Hence, the probability value for P3 corresponds to values computed across all tags since it is unsure which tag should correspond to P3 post.

The following exemplary calculations illustrate how the probabilities are induced for the resources across 2 iterations:

Iteration 1

$$R[0]=0.16+1*1*0.5=0.66$$

$$R[1]=0.16+1*1*0.5=0.66 \qquad P1$$

$$R[1]=0.66+1*1*0.3=0.96$$

$$R[2]=0.16+1*1*0.3=0.46$$

$$R[3]=0.16+1*1*0.3=0.46 \qquad P2$$

$$R[0]=0.66+1*1*0.16=0.82$$

$$R[1]=0.96+1*1*0.16=1.12$$

$R[2]=0.46+1*1*0.16=0.62$ $R[3]=0.46+1*1*0.16=0.62$ $R[4]=0.16+1*1*0.16=0.32$ $R[5]=0.16+1*1*0.16=0.32$    P3

Total Sum=0.82+1.12+0.62+0.62+0.32+0.32=3.82

Normalized Value per Tag=Tag Value/Total Sum

Therefore the values for each resource (R [0]-R [5]) after normalization are:

$R[0]=0.82/3.82=0.21$ $R[1]=1.12/3.82=0.29$ $R[2]=0.62/3.82=0.16$ $R[3]=0.62/3.82=0.16$ $R[4]=0.32/3.82=0.08$ $R[5]=0.32/3.82=0.08$

Iteration 2

$R[0]=0.21+1*1*0.5=0.71$ $R[1]=0.29+1*1*0.5=0.79$    P1

$R[1]=0.79+1*1*0.3=1.09$ $R[2]=0.16+1*1*0.3=0.46$ $R[3]=0.16+1*1*0.3=0.46$    P2

$R[0]=0.71+1*1*0.21=0.92$ $R[1]=1.09+1*1*0.29=1.38$ $R[2]=0.46+1*1*0.16=0.62$ $R[3]=0.46+1*1*0.16=0.62$ $R[4]=0.08+1*1*0.08=0.16$ $R[5]=0.08+1*1*0.08=0.16$    P3

Total Sum=0.92+1.38+0.62+0.62+0.16+0.16=3.86

Normalized Value Per Tag=Tag Value/Total Sum

Therefore the values for each resource (R [0]-R [5]) after normalization are:

$R[0]=0.92/3.86=0.23$ $R[1]=1.38/3.86=0.35$ $R[2]=0.62/3.86=0.16$ $R[3]=0.62/3.86=0.16$ $R[4]=0.16/3.86=0.04$ $R[5]=0.16/3.86=0.04$

It should be noted that the more iterations the system passes through, the higher the probability of the more relevant tags become and the lower the probability of the irrelevant tags become. From the previous example, it is clear that R[1] denoting the tag "java" will be the best tag to be recommended. Depending on the application, it is possible to present the n-best tags to the user during bookmarking of items such as bookmark posts or bibliographic entries.

Evaluation was done on 430 posts from BibSonomy which were provided as part of the ECML 2009 competition. Due to the nature of the task compared to the invention, manual annotation of the test set results was performed in order to determine if the total tags obtained with the invention approach correlates to the actual ones of the dataset. The result obtained was 63% on the given 430 posts.

Figure 8:
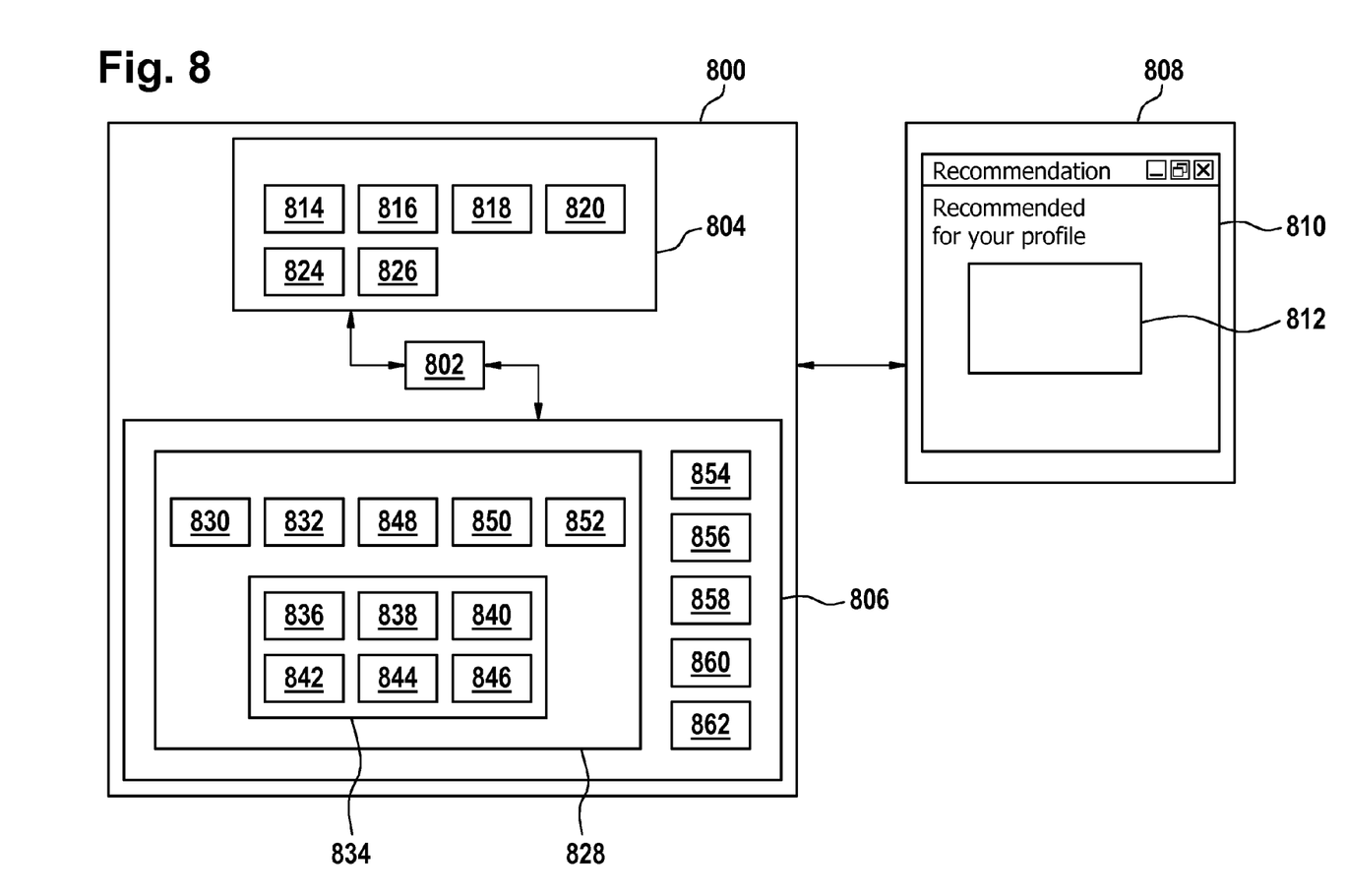
FIG. 8 shows a functional diagram of a computer system according to an embodiment of the invention.

FIG. 8 shows a computer system 800 according to an embodiment of the invention. The computer system comprises a processor 802 connected to a computer memory 804 and computer memory 806. Additionally the computer system 800 is connected to a user interface 808 which displays a graphical user interface 810. The graphical user interface 810 shows a graphical representation 812 of a data element selected according to an embodiment of the invention.

The computer storage 804 contains a program 814 for executing an embodiment of the method or essentially steps in machine executable code which causes the processor to perform an embodiment of the computer-implemented method. The program 814 may contain all the code necessary for executing an embodiment of the invention or it may use external program modules for performing certain functions. For instance there may be a path determination program module 816. The path determination module 816 contains computer executable code for determining at least one path between the starting identifier element and each data element of the set of data elements. The computer memory may also contain a natural language processing module 818 for determining weighting factors using natural language processing. The computer memory may also contain a copy of score vector 820 and a copy of a normalized score vector 824. The normalized score vector 824 is calculated using the score vector 820 as input for one iteration of the method according to the invention. The computer storage 804 may also contain a copy of the selected data element 826 or some other pointer or reference to the selected data element 826.

The computer memory 806 is shown as containing a data structure 828 which represents the K-partite graph. The K-partite graph 828 contains a set of identifier elements 830, a set of data elements 832, and a set of metadata elements 834. These actual sets 830, 832, 834 may actually be contained in the computer memory 806 or may simply contain a reference or pointer to the actual data. The set of metadata elements 834 is comprised of six different layers 836, 838, 840, 842, 844, 846. The K-partite graph 828 also contains an identifier-metadata matrix 848 which contains weighting factors between each element of the set of identifiers and each element of the set of metadata elements. The K-partite graph 828 also contains an identifier-data matrix which contains a weighting factor between each element of the set of identifier elements and each element of the set of data elements. The K-partite graph 828 further contains a layer weighting factor vector 852 which contains weighting factors for ranking the various layers 836, 838, 840, 842, 844, 846 of the set of metadata elements 834. The computer memory 806 is further shown as containing a path 854 which has been determined by the path determination program module 816. The computer memory 806 is also shown as containing the first value 856, the second value 858, the third value 830, and the fourth value 862 used for calculating one element of the normalized score vector 824.

The computer storage 804 and the computer memory 806 are examples of computer-readable storage mediums. In actual implementations the program code or data being stored may be distributed differently between the computer storage 804 and the computer memory 806. Various program elements and bits of data may also be stored on separate computers or computing systems.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer program product comprising a non-transitory computer readable storage medium having computer usable program code embodied therewith, the computer usable program code comprising:

computer usable program code configured to represent within a K-partite graph, first weighting factors between a set of identifier elements and a set of data elements, wherein the K-partite graph also represents second weighting factors between the set of identifier elements and a set of metadata elements, wherein the set of metadata elements are distributed in two or more layers, and wherein in the K-partite graph, the set of identifier elements, the set of data elements, and the set of metadata elements are independent and disjoint sets such that no two vertices within a same set are adjacent;

computer usable program code configured to provide an identifier-metadata matrix to contain a weighting factor between each identifier element of the set of identifiers elements and each metadata element of the set of metadata elements, and provide an identifier-data matrix to contain a weighting factor between each identifier element of the set of identifier elements and each data element of the set of data elements;

computer usable program code configured to calculate a score vector that ranks each data element in a set of data elements, the score vector being calculated by: adding an initialized predetermined value of score vector with an adjusted multiple of the first weighting factors and the second weighting factors traversed from a starting identifier element to a corresponding data element of the set of data elements via the set of metadata elements and another identifier elements of the set of data elements, wherein the adjusted multiple of the first weighting factors and the second weighting factors is an adjusted value, wherein the adjusted value is obtained after traversed the first weighting factors and the second weighting factors based on a number of layers for the set of the metadata; and calculating the score vector further comprises:

initializing the score vector with the predetermined value for each score;
determining a path between a starting identifier element and each data element in the set of data elements, the path being represented by a first value representing a weighting factor between the starting identifier element and a first metadata element, a second value representing a weighting factor between a first identifier element and the first metadata element, and a third value representing a weighting factor between the first identifier element and a first data element;
retrieving the first value from the identifier-metadata matrix for each path;
retrieving the second value from the identifier-metadata matrix for each path;
retrieving the third value from the identifier-data matrix for each path;
calculating an updated score for the first data element for each path by adding the predetermined value to multiple of the first value, the second value, and the third value;
calculating a normalized score vector using the updated score;
checking the normalized score vector with a predetermined iteration criterion;
when the predetermined iteration criterion was not satisfied, repeating checking the normalized vector with the predetermined iteration criterion until the predetermined iteration criterion is satisfied by replacing the score vector with the normalized score vector and recalculating the normalized score vector;

computer usable program code configured to select at least one data element from the set of data elements using the normalized score vector and a predetermined selection criterion when the predetermined iteration criteria is satisfied.

2. The computer program product of claim 1, wherein the K-partite graph is a tri-partite graph, where each of the data element of the set of data elements is a unique Web-accessible resource, wherein each identifier element of the set of identifier elements is a unique item recommended by at least one of the Web-accessible resources that encloses a set of features, wherein each feature of the set of features corresponds to one metadata element of the set of metadata elements.

3. The computer program product of claim 1, wherein the K-partite graph comprises: one layer for the set of identifier elements; one layer for the set of data elements; and two or more layers for set of metadata elements.

4. The computer program product of claim 3, wherein the two or more layers for the set of metadata elements comprise a layer weighting factor for adjusting a value of a multiple of traversed weighting factors.

5. The computer program product of claim 1, wherein the set of metadata elements is divided into two or more layers, each of the two or more layers comprising a weighting factor, and wherein the path is represented by a fourth value determined by a layer of the first metadata element, wherein the calculating the score vector further comprises replacing the predetermined value in the score vector by the predetermined value of the score vector plus a multiple of the first value, the second value, the third value, and the fourth value.

6. The computer program product of claim 1, wherein the predetermined iteration criterion comprises determining if a predetermined number of iterations have been completed.

7. The computer program product of claim 1, wherein the predetermined iteration criterion comprises for each current iteration determining if the normalized score vector converges to a value of the normalized score vector for a previous iteration.

8. The computer program product of claim 1, wherein each data element of the set of data elements comprises a text tag, each identifier element of the set of identifier elements comprises text, and wherein the weighting factor between a particular data element and a particular identifier element is determined at least partially from frequency of the text tag within the text of the identifier element.

9. The computer program product of claim 1, wherein each data element in the set of data elements comprises one data element among the following: a multimedia clip; a keyword; a bookmark tag; a text segment; a book recommendation; and a product recommendation.

10. The computer program product of claim 1, wherein the starting identifier element comprises one element among the following: a user account; a user profile; a customer account; a social networking profile; a medical health record; a book; and a journal article.

11. The computer program product of claim 1, wherein each data element of the set of data elements is a unique Web-accessible resource, wherein each identifier element of the set of identifier elements represents a unique user of a social networking Website.

12. The computer program product of claim 1, wherein each data element of the set of data elements is a multimedia item, wherein each identifier element of the set of identifier elements represents a unique user.

13. The computer program product of claim 1, wherein each data element of the set of data elements is a product recommendation, wherein each identifier element of the set of identifier elements is a digitally encoded file representing a product that corresponds to the product recommendation, wherein each metadata element of the set of metadata elements is a metadata element for the digitally encoded file.

14. A system comprising:
at least one processor;
at least one storage medium storing a set of computer program instructions;
a bus connecting the at least one processor to the at least one storage medium, wherein executing the computer program instructions using the at least one processor causes the system to:
represent within a K-partite graph, first weighting factors between a set of identifier elements and a set of data elements, wherein the K-partite graph also represents second weighting factors between the set of identifier elements and a set of metadata elements, wherein the set of metadata elements are distributed in two or more layers, and wherein in the K-partite graph, the set of identifier elements, the set of data elements, and the set of metadata elements are independent and disjoint sets such that no two vertices within a same set are adjacent, wherein the first weighing factors and the second weighing factors are at least one of input by a user and determined based on at least one natural language processing;
provide an identifier-metadata matrix to contain a weighting factor between each identifier element of the set of identifiers elements and each metadata element of the set of metadata elements, and provide an identifier-data matrix to contain a weighting factor between each identifier element of the set of identifier elements and each data element of the set of data elements;
calculate a score vector that ranks each data element in the set of data elements by: adding an initialized predetermined value of score vector with an adjusted multiple of the first weighting factors and the second weighting factors traversed from a starting identifier element to a corresponding data element of the set of data elements via the set of metadata elements and another identifier elements of the set of data elements, wherein the adjusted multiple of the first weighting factors and the second weighting factors is an adjusted value, wherein the adjusted value is obtained after traversed the first weighting factors and the second weighting factors based on a number of layers for the set of the metadata; and calculating the score vector further comprises:
initializing the score vector with the predetermined value for each score;
determining a path between a starting identifier element and each data element in the set of data elements, the path being represented by a first value representing a weighting factor between the starting identifier element and a first metadata element, a second value representing a weighting factor between a first identifier element and the first metadata element, and a third value representing a weighting factor between the first identifier element and a first data element;
retrieving the first value from the identifier-metadata matrix for each path;
retrieving the second value from the identifier-metadata matrix for each path;
retrieving the third value from the identifier-data matrix for each path;
calculating an updated score for the first data element for each path by adding the predetermined value to multiple of the first value, the second value, and the third value;
calculating a normalized score vector using the updated score;
checking the normalized score vector with a predetermined iteration criterion:
when the predetermined iteration criterion was not satisfied, repeating checking the normalized vector with the predetermined iteration criterion until the predetermined iteration criterion is satisfied by replacing the score vector with the normalized score vector and recalculating the normalized score vector;
select at least one data element from the set of data elements using the normalized score vector and a predetermined selection criterion when the predetermined iteration criteria is satisfied.

15. A system comprising:
at least one processor;
at least one storage medium storing a set of computer program instructions;
a bus connecting the at least one processor to the at least one storage medium, wherein executing the computer program instructions using the at least one processor causes the system to:
generate a K-partite graph to represent first weighing factors between a set of identifier elements and a set of data elements, wherein the K-partite graph represents second weighting factors between the set of identifier elements and a set of metadata elements, wherein each data element in the set of data elements is selected from a group consisting of: (i) a multimedia clip; (ii) a keyword; (iii) a bookmark tag; (iv) a text segment; (v) a book recommendation; and (vi) a product recommendation, and wherein each identifier element in the set of identifier elements is selected from a group consisting of: (i) a user account; (ii) a user profile; (iii) a customer account; (iv) a social networking profile; (v) a medical health record; (vi) a book; and (vii) a journal article, wherein the set of metadata elements are distributed in two or more layers;

provide an identifier-metadata matrix to contain a weighting factor between each identifier element of the set of identifiers elements and each metadata element of the set of metadata elements, and provide an identifier-data matrix to contain a weighting factor between each identifier element of the set of identifier elements and each data element of the set of data elements;

calculate a score vector that ranks each data element in a set of data elements, the score vector being calculated by adding an initialized predetermined value of score vector with an adjusted multiple of the first weighting factors and the second weighting factors traversed from a starting identifier element to a corresponding data element of the set of data elements via the set of metadata elements and another identifier elements of the set of data elements, wherein the adjusted multiple of the first weighting factors and the second weighting factors is an adjusted value, wherein the adjusted value is obtained after traversed the first weighting factors and the second weighting factors based on a number of layers for the set of the metadata; and calculating the score vector further comprises:

initializing the score vector with the predetermined value for each score;

determining a path between a starting identifier element and each data element in the set of data elements, the path being represented by a first value representing a weighting factor between the starting identifier element and a first metadata element, a second value representing a weighting factor between a first identifier element and the first metadata element, and a third value representing a weighting factor between the first identifier element and a first data element;

retrieving the first value from the identifier-metadata matrix for each path;

retrieving the second value from the identifier-metadata matrix for each path;

retrieving the third value from the identifier-data matrix for each path;

calculating an updated score for the first data element for each path by adding the predetermined value to multiple of the first value, the second value, and the third value;

calculating a normalized score vector using the updated score;

checking the normalized score vector with a predetermined iteration criterion;

when the predetermined iteration criterion was not satisfied, repeating checking the normalized vector with the predetermined iteration criterion until the predetermined iteration criterion is satisfied by replacing the score vector with the normalized score vector and recalculating the normalized score vector;

select at least one data element from the set of data elements using the normalized score vector and a predetermined selection criterion when the predetermined iteration criteria is satisfied.

* * * * *